(12) United States Patent
Nakagawa et al.

(10) Patent No.: US 11,845,211 B2
(45) Date of Patent: Dec. 19, 2023

(54) INJECTION DEVICE AND INJECTION MOLDING MACHINE

(71) Applicant: THE JAPAN STEEL WORKS, LTD., Tokyo (JP)

(72) Inventors: Yutaka Nakagawa, Tokyo (JP); Yusuke Yonehara, Tokyo (JP); Toshio Toyoshima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/831,876

(22) Filed: Jun. 3, 2022

(65) Prior Publication Data

US 2022/0396021 A1 Dec. 15, 2022

(30) Foreign Application Priority Data

Jun. 14, 2021 (JP) ................. 2021-098480

(51) Int. Cl.
*B29C 45/74* (2006.01)
*B29C 45/67* (2006.01)

(52) U.S. Cl.
CPC .......... *B29C 45/6707* (2013.01); *B29C 45/74* (2013.01)

(58) Field of Classification Search
None
See application file for complete search history.

(56) References Cited

U.S. PATENT DOCUMENTS 5,863,474 A * 1/1999 Ito ................. B29C 45/1751
264/40.5

FOREIGN PATENT DOCUMENTS

JP 2009255476 A 11/2009

OTHER PUBLICATIONS

Jinno JP2009255476 English translation 2009 (Year: 2009).*
Gemini Group "Two-Shot Injection Molding Solutions" Wayback Machine Sep. 29, 2020 (Year: 2020).*

* cited by examiner

*Primary Examiner* — Jacob T Minskey
*Assistant Examiner* — Adrien J Bernard
(74) *Attorney, Agent, or Firm* — Sughrue Mion, PLLC

(57) ABSTRACT

An injection device includes: a heating cylinder; a screw disposed in the heating cylinder; and a pair of piston cylinder components disposed on two sides of the heating cylinder. The pair of piston cylinder components are installed so that one end portion of each of the pair of piston cylinder components is connected to a mold clamping device, and the heating cylinder and the screw are integrally driven in a direction close to or away from the mold clamping device by expansion and contraction of the pair of piston cylinder components. One of the pair of piston cylinder components is provided with a stop mechanism configured to stop expansion and contraction of the piston cylinder component.

15 Claims, 9 Drawing Sheets

INJECTION DEVICE AND INJECTION MOLDING MACHINE

CROSS-REFERENCE TO RELATED APPLICATIONS

This application is based on and claims priority under 35 USC 119 from Japanese Patent Application No. 2021-098480 filed on Jun. 14, 2021, the contents of which are incorporated herein by reference.

TECHNICAL FIELD

The present disclosure relates to an injection device and an injection molding machine, and more particularly to an injection device and an injection molding machine that are driven by a pair of piston cylinder components in a direction close to or away from a mold clamping device.

BACKGROUND ART

As disclosed in JP 2009-255476 A (PTL 1), for example, an injection device includes a heating cylinder, a screw inserted into the heating cylinder, and a pair of piston cylinder units disposed on two sides of the heating cylinder. One end portion of each of the pair of piston cylinder units is connected to a mold clamping device, and the other end portion of each of the pair of piston cylinder units is connected to a member of the injection device. When the pair of piston cylinder units are expanded and contracted, the injection device is brought close to or away from the mold clamping device. Accordingly, an injection nozzle provided at a tip end of the heating cylinder can be brought into contact with and away from a mold.

SUMMARY

When performing maintenance such as replacement of a heating cylinder, a screw, and an injection nozzle in an injection device, it is necessary to separate a pair of piston cylinder units from a mold clamping device in advance. The pair of piston cylinder units and the mold clamping device are disconnected from each other, and the injection device is swiveled by a swivel device. Alternatively, the injection device is moved up and down by a lift device. Then, the injection device is maintained. When the maintenance is completed, the injection device is returned to an original position, and the pair of piston cylinder units are connected again to the mold clamping device. Thus, every time the maintenance of the injection device is performed, it is necessary to disconnect the pair of piston cylinder units and the mold clamping device in advance and reconnect the pair of piston cylinder units and the mold clamping device after the maintenance. Accordingly, there is a problem that operation time becomes long.

The present disclosure provides an injection device and an injection molding machine capable of shortening operation time required for maintenance.

Other problems and novel features will become apparent from description of this specification and accompanying drawings.

According to one illustrative aspect of the present disclosure, provided is an injection device including: a heating cylinder; a screw disposed in the heating cylinder; and a pair of piston cylinder components disposed on two sides of the heating cylinder. The pair of piston cylinder components are installed so that one end portion of each of the pair of piston cylinder components is connected to a mold clamping device, and the heating cylinder and the screw are integrally driven in a direction close to or away from the mold clamping device by expansion and contraction of the pair of piston cylinder components. One of the pair of piston cylinder components is a piston cylinder component provided with a stop mechanism configured to prevent expansion and contraction of the piston cylinder component.

According to the present disclosure, when the injection device is maintained, it is not necessary to disconnect the piston cylinder component having the stop mechanism from the mold clamping device, and operation time can be shortened.

DETAILED DESCRIPTION

Figure 1:
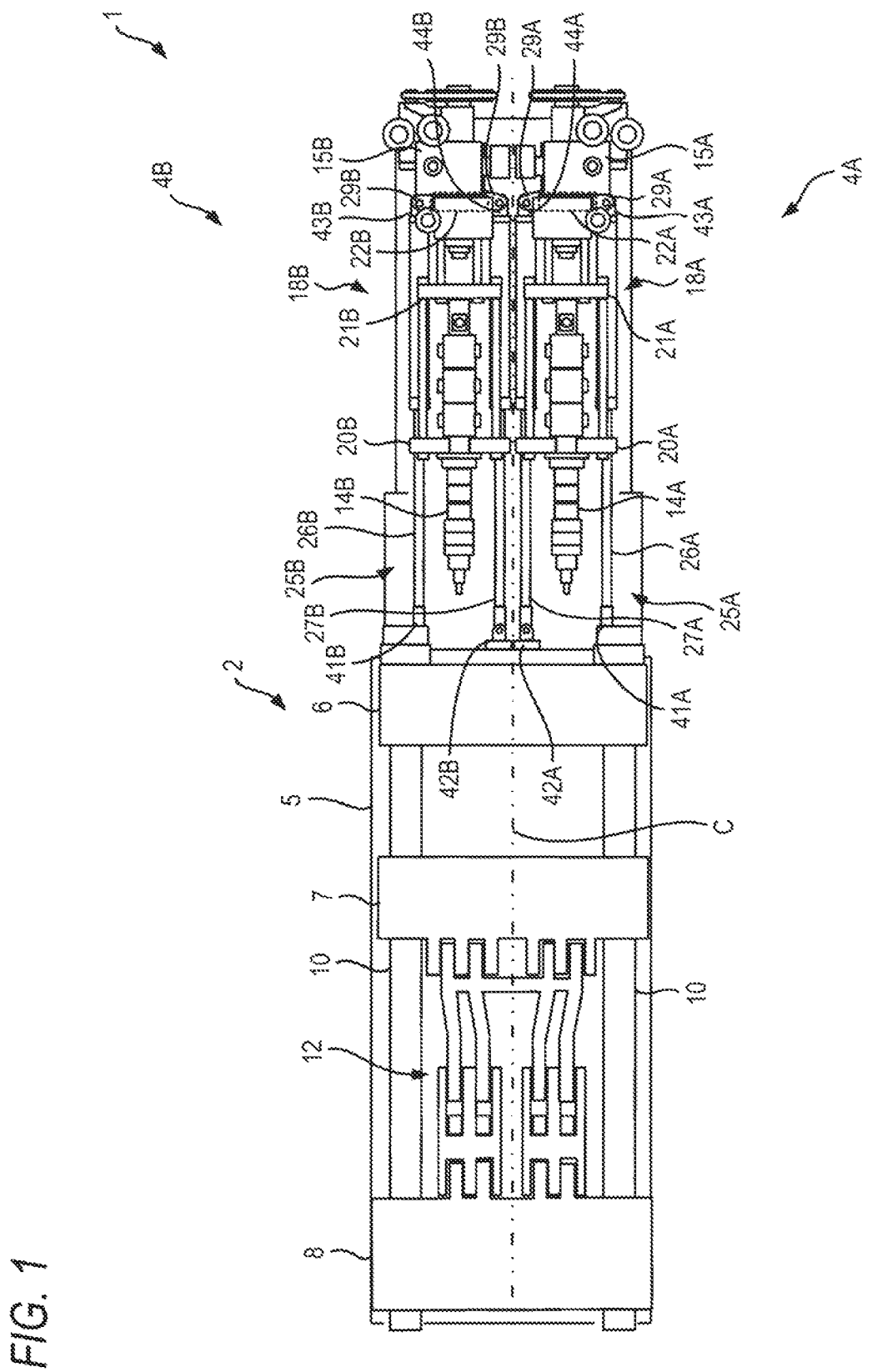
FIG. 1 is a top view showing a twin injection molding machine according to the present illustrative embodiment.

Hereinafter, a specific illustrative embodiment will be described in detail with reference to drawings. However, the present disclosure is not limited to the following illustrative embodiments. In order to clarify description, following description and the drawings are simplified as appropriate. In all the drawings, the same elements are denoted by the same reference signs, and repetitive description thereof is omitted as necessary. In addition, there is a portion where hatching is omitted such that the drawing is not complicated.

{Twin Injection Molding Machine}

As shown in FIG. 1, a twin injection molding machine 1 according to the present illustrative embodiment includes one mold clamping device 2, a first injection device 4A, and a second injection device 4B. The twin injection molding machine 1 according to the present illustrative embodiment is a so-called metal injection molding machine that melts and injects a metal. However, the present disclosure can be similarly implemented not only by the metal injection molding machine but also by an injection molding machine that injects a resin.

{Mold Clamping Device}

The mold clamping device 2 includes a fixed platen 6 fixed to a bed 5, a movable platen 7 slidably provided on the bed 5, and a mold clamping housing 8 slidably provided on the bed 5. The fixed platen 6 and the mold clamping housing 8 are connected by a plurality of tie bars 10, 10, . . . , and the movable platen 7 is slidably disposed between the fixed platen 6 and the mold clamping housing 8. A toggle mechanism 12, which is a mold clamping mechanism, is provided between the mold clamping housing 8 and the movable platen 7. When a drive system component (not shown), for example, a mold clamping motor is driven to bend and stretch the toggle mechanism 12, the movable platen 7 slides to open and close a mold. The mold clamping mechanism does not have to be limited to the toggle mechanism 12, and a mold clamping cylinder or the like can be adopted.

{Injection Device}

The first injection device 4A and the second injection device 4B according to the present illustrative embodiment are disposed symmetrically with respect to a machine center line C of the mold clamping device 2. Components forming the first injection device 4A and the second injection device 4B are also substantially symmetrical with respect to the machine center line C. Therefore, the first injection device 4A, which is one of the injection devices, will be described, and description of the second injection device 4B is omitted unless necessary. The component of the first injection device 4A is denoted by a reference sign obtained by combining a number and "A", and an equivalent component of the second injection device 4B is denoted by a reference sign obtained by combining the same number and "B".

The first injection device 4A includes a heating cylinder 14A, a screw (not shown) inserted into the heating cylinder 14A, and a screw drive device 15A that drives the screw in a rotation direction and an axial direction. Originally, a rear end portion of the screw is connected to the screw drive device 15A and is driven by the screw drive device 15A. Then, the rear end portion of the screw should be shown in FIG. 1. However, FIG. 1 shows a state where the screw is separated from the screw drive device 15A and completely accommodated in the heating cylinder 14A. That is, the heating cylinder 14A and the screw can be detached from the first injection device 4A by a hoist crane for the purpose of maintenance or the like.

The first injection device 4A is supported by a support frame 18A. The support frame 18A includes first to third plates 20A, 21A, and 22A. The first and second plates 20A and 21A and the second and third plates 21A and 22A are connected by a plurality of rods. A central portion and a rear end portion of the heating cylinder 14A are supported by the first and second plates 20A and 21A, respectively. The screw drive device 15A is provided on the third plate 22A.

{Moving Device}

The first injection device 4A includes a moving device 25A according to the first illustrative embodiment of the present illustrative embodiment that moves the heating cylinder 14A, the screw, and the like close to or away from the mold clamping device 2. The moving device 25A includes a pair of piston cylinder components 26A and 27A. The pair of piston cylinder components 26A and 27A are disposed on two sides of the heating cylinder 14A, one of the piston cylinder components 26A and 27A is disposed on a side away from the machine center line C, that is, on an outer side, and the other of the piston cylinder components 26A and 27A is disposed on a side close to the machine center line C, that is, on an inner side.

Hereinafter, the pair of piston cylinder components 26A and 27A are appropriately referred to as an outer piston cylinder component 26A and an inner piston cylinder component 27A. One end portion 41A and one end portion 42A of the outer piston cylinder component 26A and the inner piston cylinder component 27A are connected to the fixed platen 6, and the other end portion 43A and the other end portion 44A of the outer piston cylinder component 26A and the inner piston cylinder component 27A are connected to clevises 29A and 29A provided on the third plate 22A of the support frame 18A.

The outer piston cylinder component 26A and the inner piston cylinder component 27A are expanded and contracted by being supplied with pressure oil by a hydraulic pressure supply mechanism described below. When the outer piston cylinder component 26A and the inner piston cylinder component 27A are expanded and contracted, the heating cylinder 14A, the screw, and the like move close to or away from the mold clamping device 2. As will be described later, the inner piston cylinder component 27A close to the machine center line C is provided with a stop mechanism to hinder supply of the pressure oil to a hydraulic circuit of the inner piston cylinder component 27A to prevent expansion and contraction of the inner piston cylinder component 27A. That is, the inner piston cylinder component 27A is the piston cylinder component 27A having the stop mechanism.

{Hydraulic Circuit of Moving Device}

Figure 2:
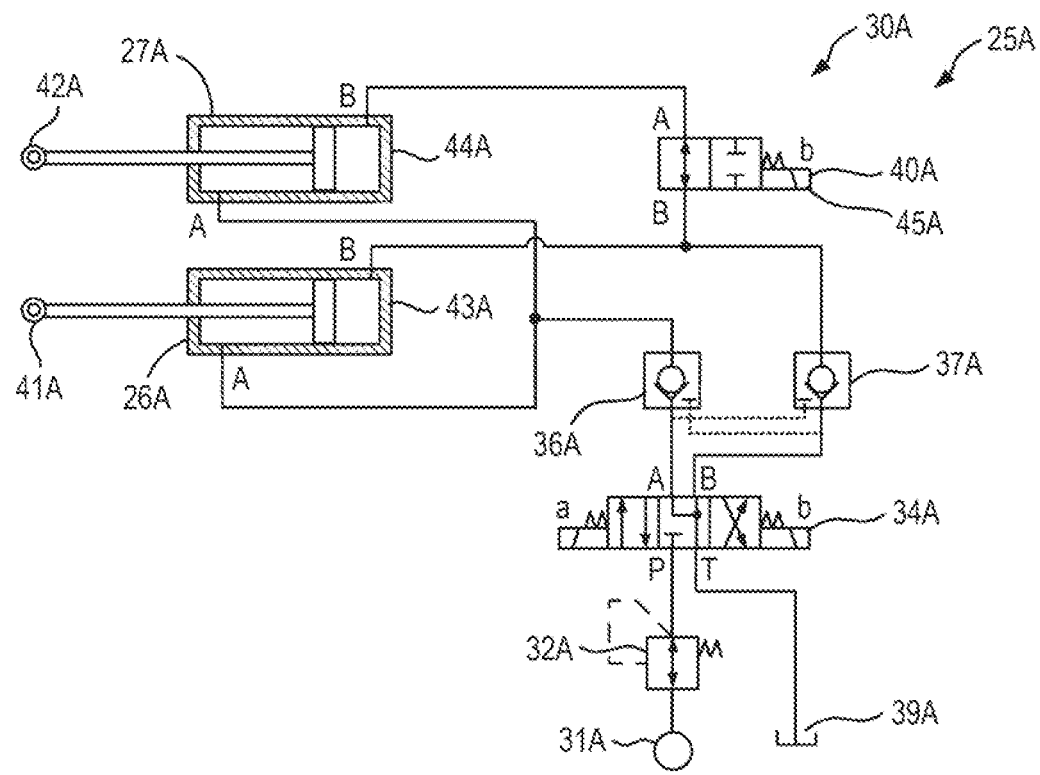
FIG. 2 is a hydraulic circuit diagram showing a moving device according to a first illustrative embodiment of the present illustrative embodiment.

The moving device 25A includes a hydraulic pressure supply mechanism 30A shown in FIG. 2. The hydraulic pressure supply mechanism 30A includes a hydraulic pressure source 31A, a pressure reducing valve 32A, a direction switching valve 34A, a first pilot check valve 36A, and a second pilot check valve 37A. A hydraulic pressure of the pressure oil supplied from the hydraulic pressure source 31A is adjusted by the pressure reducing valve 32A, and is sent to the direction switching valve 34A. The direction switching valve 34A includes four ports A, B, P, and T, and is configured with a so-called four-port three-position direction control valve that switches to three positions by two solenoids a and b. The direction switching valve 34A supplies the pressure oil to the A port or the B port, or stops the supply of the pressure oil.

The A port of the direction switching valve 34A is connected to the first pilot check valve 36A, and a pipeline of the pressure oil from the first pilot check valve 36A branches and is connected to an A port of the outer piston cylinder component 26A and an A port of the inner piston cylinder component 27A. On the other hand, the B port of the direction switching valve 34A is connected to the second pilot check valve 37A, and a pipeline of the pressure oil from the second pilot check valve 37A branches and is connected to a B port of the outer piston cylinder component 26A and a B port of the inner piston cylinder component 27A. However, a stop mechanism 40A that stops the supply of the pressure oil is provided in a pipeline from the second pilot check valve 37A to the B port of the inner piston cylinder component 27A. The stop mechanism 40A will be described later.

The first pilot check valve 36A and the second pilot check valve 37A are both valves that prevent backflow of the pressure oil, but the first pilot check valve 36A and the second pilot check valve 37A cancel backflow prevention of the pressure oil to each other. Specifically, when the hydraulic pressure is applied to an input side of the first pilot check valve 36A, the second pilot check valve 37A is operated to cancel the backflow prevention of the pressure oil in the second pilot check valve 37A. That is, the backflow of the pressure oil is allowed. On the other hand, when the hydraulic pressure is applied to an input side of the second pilot check valve 37A, the first pilot check valve 36A is operated to cancel the backflow prevention of the pressure oil in the first pilot check valve 36A. That is, the backflow of the pressure oil is allowed. The pressure oil that flows back through the first pilot check valve 36A and the second pilot check valve 37A is returned to an oil tank 39A via the direction switching valve 34A.

{Stop Mechanism}

The hydraulic pressure supply mechanism 30A is provided with the stop mechanism 40A that stops the supply of the pressure oil to a B port side of the inner piston cylinder component 27A. In the present illustrative embodiment, the stop mechanism 40A includes a stop valve 45A. The stop valve 45A is switched by a solenoid b, and allows or stops the supply of the pressure oil. When the supply of the pressure oil is stopped by the stop valve 45A, the supply of the pressure oil to the B port of the inner piston cylinder component 27A and discharge of the pressure oil from the B port are also stopped. That is, the inner piston cylinder component 27A cannot expand and contract.

{Function of Twin Injection Molding Machine}

In the twin injection molding machine 1 (see FIG. 1) according to the present illustrative embodiment, the first injection device 4A includes the moving device 25A, and the second injection device 4B includes a moving device 25B according to the first illustrative embodiment of the present illustrative embodiment. The first injection device 4A is driven by the moving device 25A, and the second injection device 4B is driven by the moving device 25B according to the first illustrative embodiment of the present illustrative embodiment. First, a normal operation method will be described.

Figure 3:
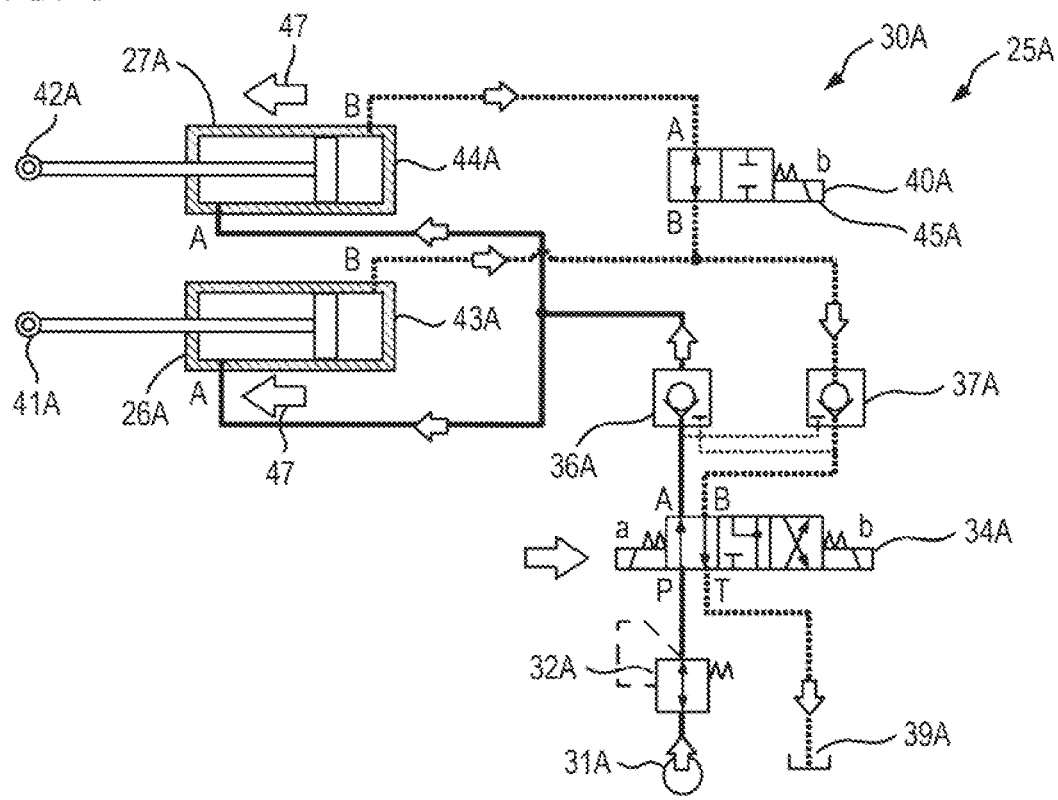
FIG. 3 is a hydraulic circuit diagram showing the moving device according to the first illustrative embodiment of the present illustrative embodiment.

In the first injection device 4A and the second injection device 4B (see FIG. 1), the heating cylinders 14A and 14B, the screw drive devices 15A and 15B, and the like are brought close to the fixed platen 6 as follows. As shown in FIG. 3, in the hydraulic pressure supply mechanism 30A, the stop valve 45A is kept in a normal state, that is, the pressure oil is allowed to be supplied. Although not shown in the drawing, a hydraulic pressure supply mechanism 30B provided in the moving device 25B of the second injection device 4B also operates a stop valve 45B similarly in the hydraulic pressure supply mechanism 30B. Hereinafter, the hydraulic pressure supply mechanism 30B (not shown) is operated similarly as the hydraulic pressure supply mechanism 30A shown in FIG. 3, and description of an operation of the hydraulic pressure supply mechanism 30B is omitted.

The solenoid a in the direction switching valve 34A is driven. Then, the pressure oil from the hydraulic pressure source 31A passes through the first pilot check valve 36A and is supplied to the A ports of the outer piston cylinder component 26A and the inner piston cylinder component 27A. Since the end portions 41A and 42A of the outer piston cylinder component 26A and the inner piston cylinder component 27A, respectively, are fixed to the fixed platen 6 (see FIG. 1), the outer piston cylinder component 26A and the inner piston cylinder component 27A are driven in directions of arrows 47 and 47 (see FIG. 3). That is, the heating cylinders 14A and 14B and the like are close to the fixed platen 6. At this time, the pressure oil is discharged from the B ports of the outer piston cylinder component 26A and the inner piston cylinder component 27A. Discharged pressure oil is returned to the oil tank 39A through the second pilot check valve 37A and the direction switching valve 34A.

Figure 4:
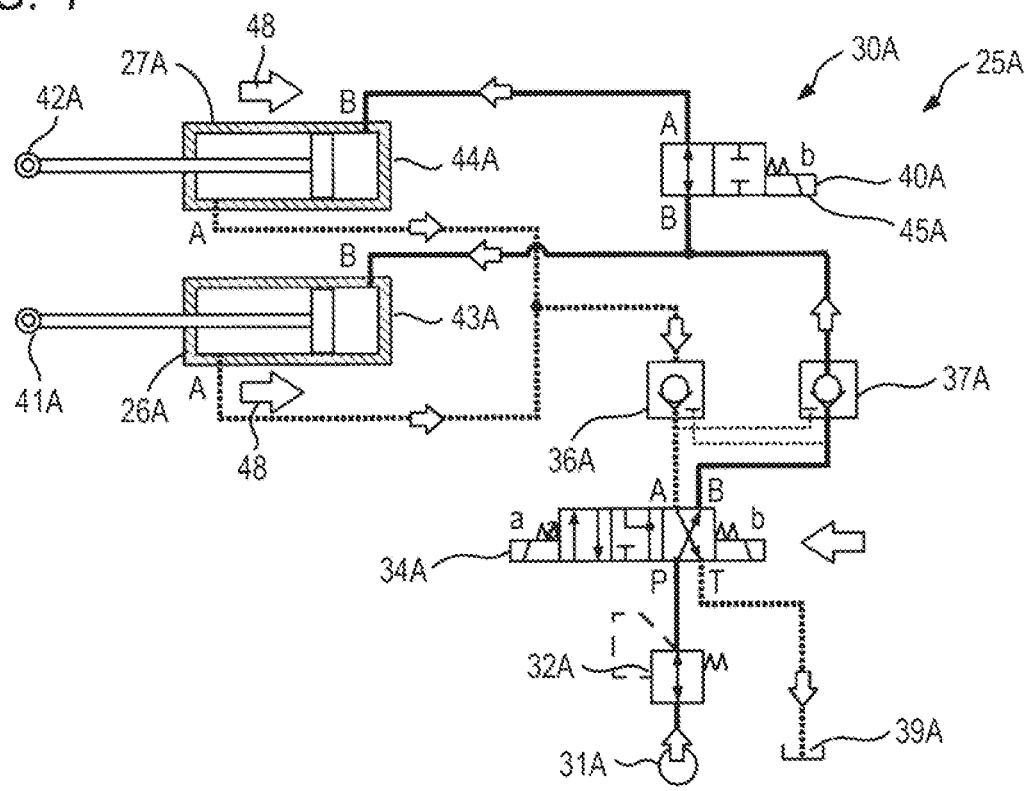
FIG. 4 is a hydraulic circuit diagram showing the moving device according to the first illustrative embodiment of the present illustrative embodiment.

In the first injection device 4A and the second injection device 4B (see FIG. 1), the heating cylinders 14A and 14B, the screw drive devices 15A and 15B, and the like are away from the fixed platen 6 as follows. As shown in FIG. 4, in the hydraulic pressure supply mechanism 30A, the stop valve 45A is kept in the normal state, that is, the pressure oil is allowed to be supplied. As described above, although not shown in the drawing, the hydraulic pressure supply mechanism 30B provided in the moving device 25B of the second injection device 4B is operated similarly as the hydraulic pressure supply mechanism 30A.

The solenoid b in the direction switching valve 34A is driven. The pressure oil from the hydraulic pressure source 31A passes through the first pilot check valve 36A and is supplied to the B ports of the outer piston cylinder component 26A and the inner piston cylinder component 27A. Since the end portions 41A and 42A of the outer piston cylinder component 26A and the inner piston cylinder component 27A, respectively, are fixed to the fixed platen 6 (see FIG. 1), the outer piston cylinder component 26A and the inner piston cylinder component 27A are driven in directions of arrows 48 and 48 (see FIG. 4). That is, the heating cylinders 14A and 14B and the like areaway from the fixed platen 6. The pressure oil in the A ports of the outer piston cylinder component 26A and the inner piston cylinder component 27A is returned to the oil tank 39A.

When maintenance of the first injection device 4A and the second injection device 4B (see FIG. 1) is performed, the following is performed. First, as described above, the heating cylinders 14A and 14B, the screw drive devices 15A and 15B, and the like are sufficiently away from the fixed platen 6 by operating the moving devices 25A and 25B according to the first illustrative embodiment of the present illustrative embodiment. Next, the one end portion 41A and the one end portion 41B of the outer piston cylinder components 26A and 26B, respectively, of the first injection device 4A and the second injection device 4B, respectively, are separated from the fixed platen 6.

Figure 5:
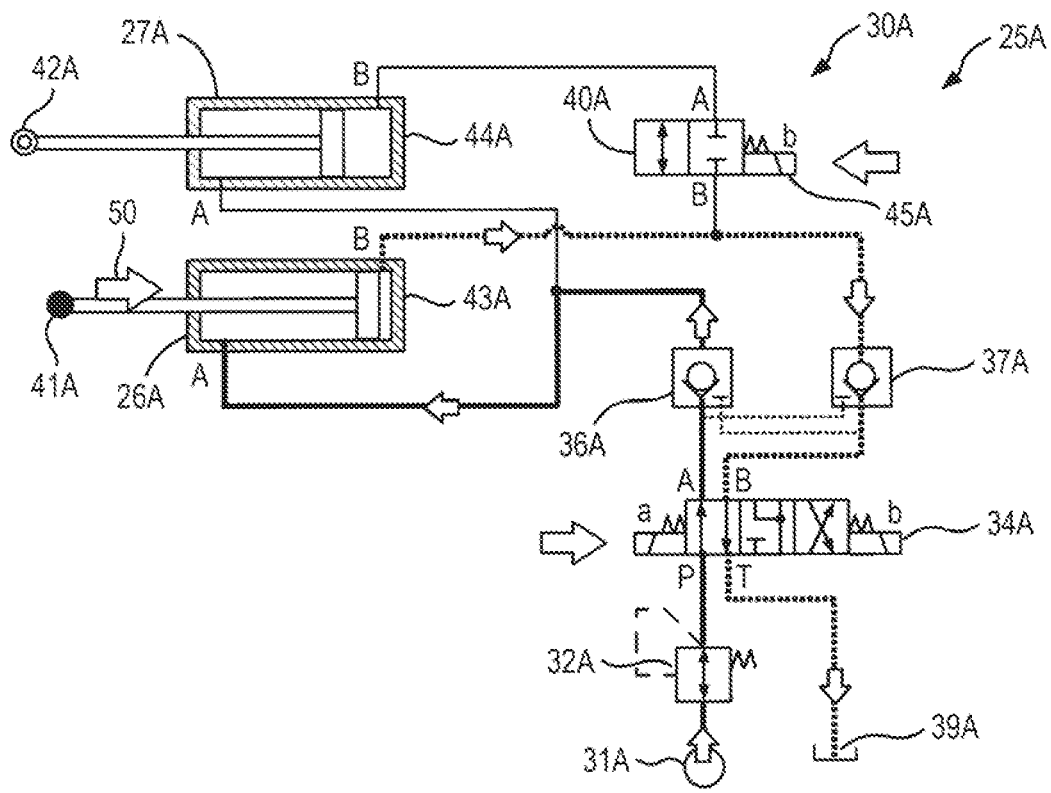
FIG. 5 is a hydraulic circuit diagram showing the moving device according to the first illustrative embodiment of the present illustrative embodiment.
Figure 6:
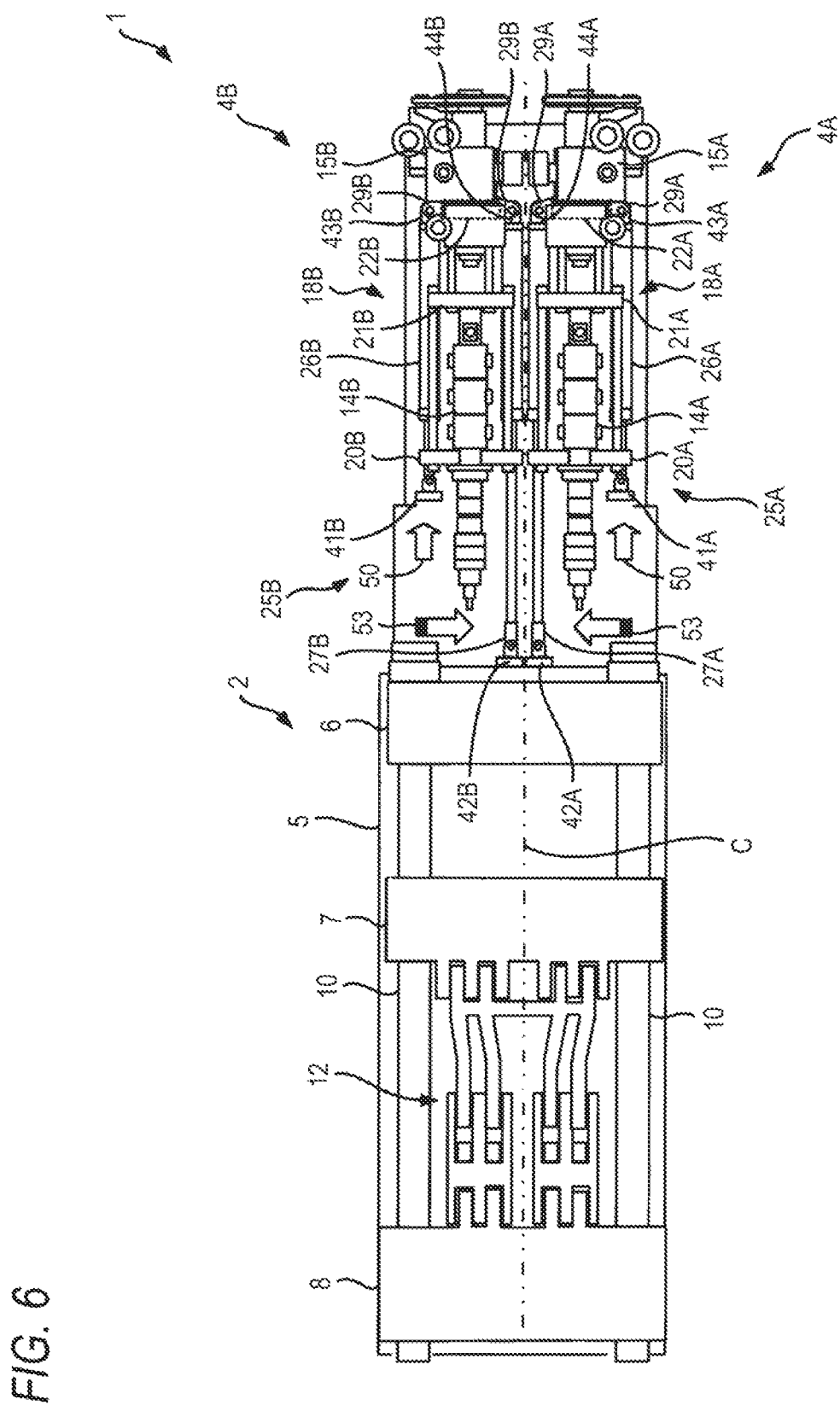
FIG. 6 is a top view showing the twin injection molding machine according to the present illustrative embodiment.

As shown in FIG. 5, in the hydraulic pressure supply mechanism 30A, the solenoid b of the stop valve 45A is driven to stop the supply of the pressure oil. The hydraulic pressure supply mechanism 30B (not shown) is also operated similarly as described below. That is, although not shown, the hydraulic pressure supply mechanism 30B is provided with a stop mechanism 40B that stops the supply of the pressure oil to a B port side of the inner piston cylinder component 27B. The solenoid a in the direction switching valve 34A is driven. The pressure oil from the hydraulic pressure source 31A is supplied to the A port of the outer piston cylinder component 26A. However, since flow of the pressure oil in the inner piston cylinder component 27A is hindered by the stop mechanism 40A, the pressure oil is not supplied. Since the one end portion 41A of the outer piston cylinder component 26A is separated from the fixed platen 6 (see FIG. 1), the outer piston cylinder component 26A is driven in a direction of an arrow 50 as shown in FIG. 5. A state where the outer piston cylinder components 26A and 26B of the first injection device 4A and the second injection device 4B are contracted as thus is shown in FIG. 6.

At this time, since inner piston cylinder components 27A and 27B are stopped by the stop mechanisms 40A and 40B, the first injection device 4A and the second injection device 4B do not move. Since the outer piston cylinder components 26A and 26B are contracted, the maintenance of the first injection device 4A and the second injection device 4B is not hindered. Required maintenance is performed.

In the related art, at the time of the maintenance, it is necessary to separate the one end portion 42A and the one end portion 42B of the inner piston cylinder components 27A and 27B from the fixed platen 6. However, in this case, as indicated by arrows 53 and 53 in FIG. 6, it is necessary for an operator to cross the first injection device 4A and the second injection device 4B, and there is a danger. Then, it takes operation time to separate. In the twin injection molding machine 1 according to the present illustrative embodiment provided with the moving devices 25A and 25B according to the first illustrative embodiment of the present illustrative embodiment, it is not necessary to separate the inner piston cylinder components 27A and 27B from the fixed platen 6 at the time of the maintenance, which is safe, and the operation time can be shortened.

Figure 7:
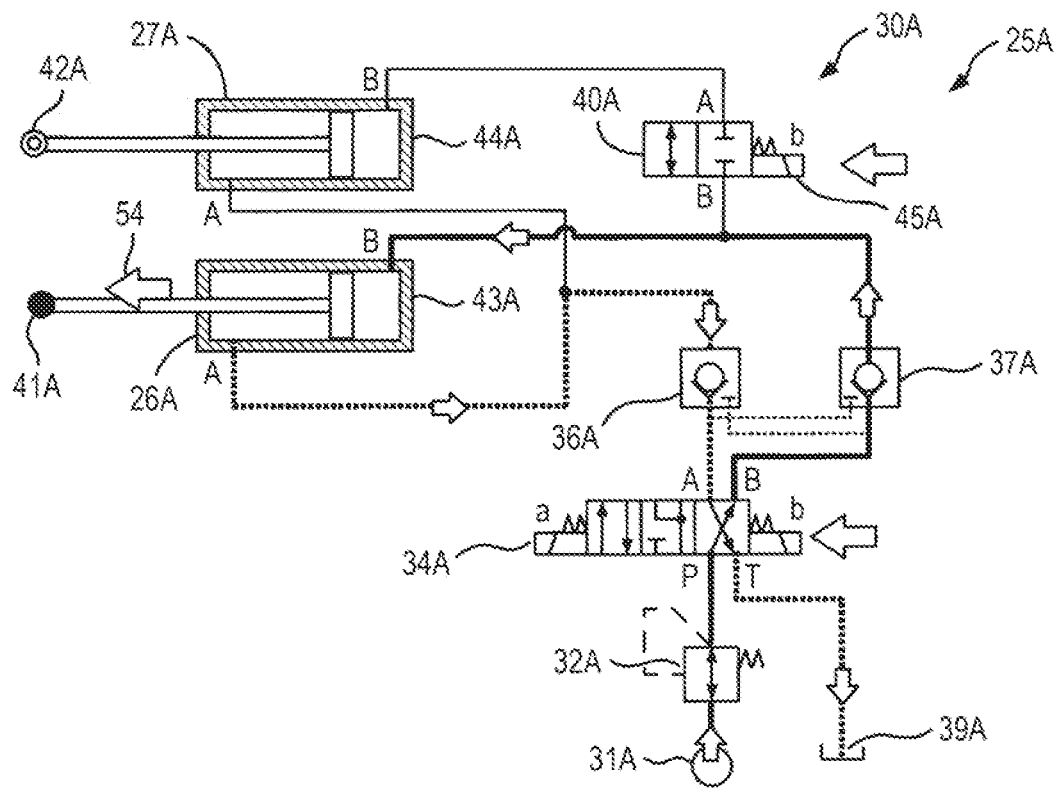
FIG. 7 is a hydraulic circuit diagram showing the moving device according to the first illustrative embodiment of the present illustrative embodiment.

When the maintenance is completed, as shown in FIG. 7, the hydraulic pressure supply mechanism 30A is operated as follows. Although not shown in the drawing, the hydraulic pressure supply mechanism 30B is also operated similarly. First, the supply of the pressure oil to the inner piston cylinder component 27A is stopped in a state where the solenoid b is driven in the stop valve 45A. The solenoid b of the direction switching valve 34A is driven. The pressure oil from the hydraulic pressure source 31A is supplied only to the B port of the outer piston cylinder component 26A via the second pilot check valve 37A. The one end portion 41A of the outer piston cylinder component 26A is driven as indicated by an arrow 54. That is, the outer piston cylinder component 26A expands. Similarly, the outer piston cylinder component 26B of the second injection device 4B (see FIG. 1) also expands. The one end portion 41A and the one end portion 41B of the outer piston cylinder components 26A and 26B, respectively, are connected to the fixed platen 6.

In the above description, the hydraulic pressure supply mechanism 30A shown in FIG. 2 and the hydraulic pressure supply mechanism 30B (not shown) perform the same operation at the same time. That is, the same operation is performed in the first injection device 4A and the second injection device 4B. However, in the first injection device 4A and the second injection device 4B, since the hydraulic pressure supply mechanisms 30A and 30B are provided independently and separately, only one of the hydraulic pressure supply mechanisms 30A and 30B can be operated. That is, when only the first injection device 4A is to be maintained, only the hydraulic pressure supply mechanism 30A may be operated.

{Injection Molding Machine with One Injection Device}

Figure 8:
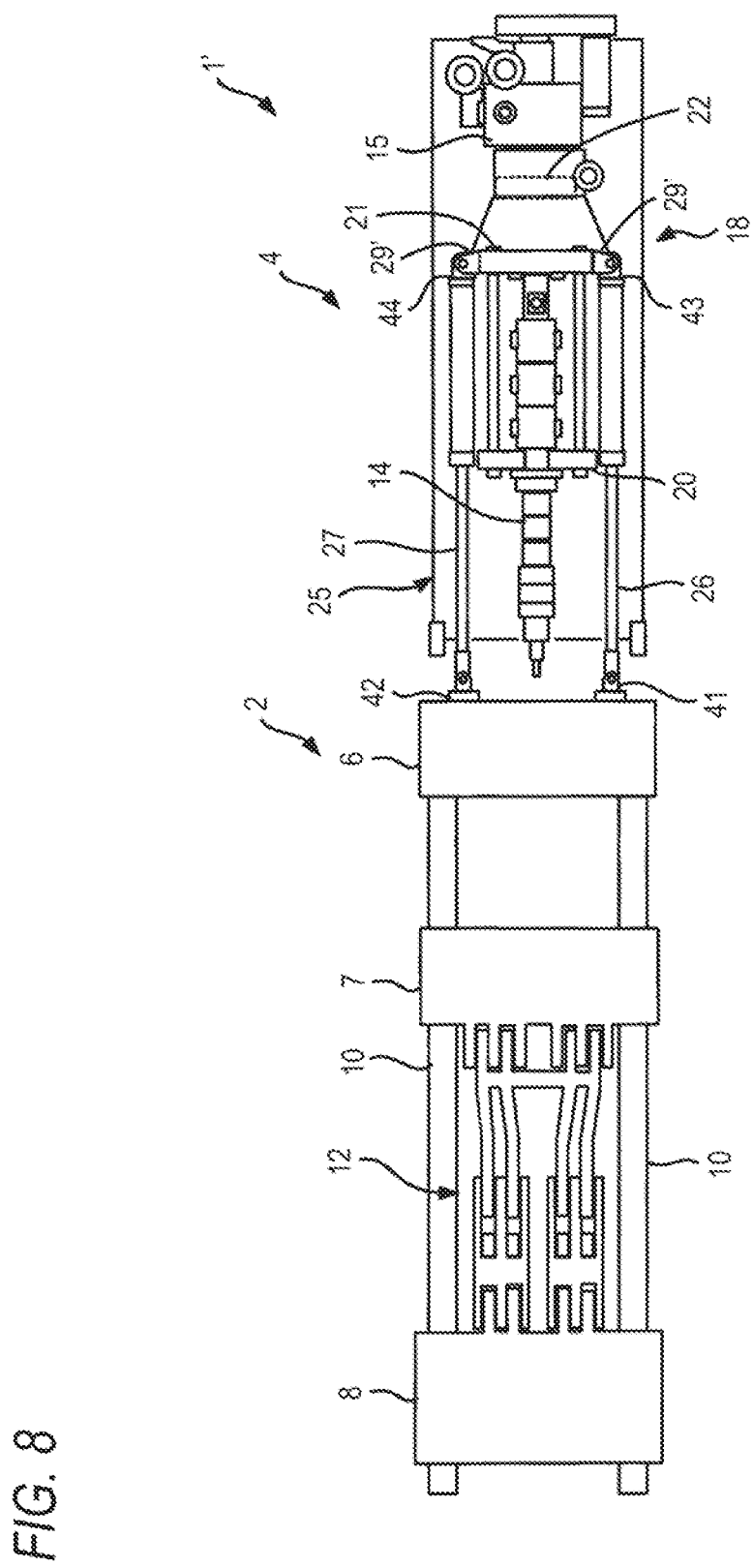
FIG. 8 is a top view showing an injection molding machine according to the present illustrative embodiment.

The moving device 25A according to the first illustrative embodiment of the present illustrative embodiment shown in FIG. 2 can also be adopted in an injection molding machine having one injection device. An injection molding machine 1' provided with one injection device 4 is shown in FIG. 8. In the injection molding machine 1', the same reference signs are given to devices and members that have similar functions as devices and members provided in the twin injection molding machine 1 (see FIG. 1) according to the present illustrative embodiment, and description thereof is omitted. The twin injection molding machine 1 is provided with the two injection devices 4A and 4B, and the members provided in the injection devices 4A and 4B are described with reference signs obtained by combining a number and alphabetic characters "A" and "B", but the members having similar functions in the injection molding machine 1' are denoted with the reference signs made of the same numbers and description thereof is omitted.

The injection molding machine 1' is provided with a first piston cylinder component 26 and a second piston cylinder component 27. The first piston cylinder component 26 and the second piston cylinder component 27 are also provided with the hydraulic pressure supply mechanism 30A as shown in FIG. 2. That is, among the first piston cylinder component 26 and the second piston cylinder component 27, the second piston cylinder component 27 is provided with a stop mechanism that hinders the supply of the pressure oil in a hydraulic circuit of the second piston cylinder component 27 to prevent the expansion and contraction of the second piston cylinder component 27, and the second piston cylinder component 27 is the piston cylinder component 27 having the stop mechanism.

One end portion 41 and one end portion 42 of the first piston cylinder component 26 and the second piston cylinder component 27 are connected to the fixed platen 6. However, in this illustrative embodiment, the other end portion 43 and the other end portion 44 are connected to clevises 29' and 29' of a second plate 21 of a support frame 18. That is, the first piston cylinder component 26 and the second piston cylinder component 27 are shorter than the pair of piston cylinder components 26A and 27A of the twin injection molding machine 1 according to the present illustrative embodiment shown in FIG. 1. Therefore, in the injection molding machine 1' shown in FIG. 8, a distance for separating the injection device 4 from the fixed platen 6 is slightly shorter, and it is necessary to swivel the injection device 4 at the time of the maintenance.

Figure 9:
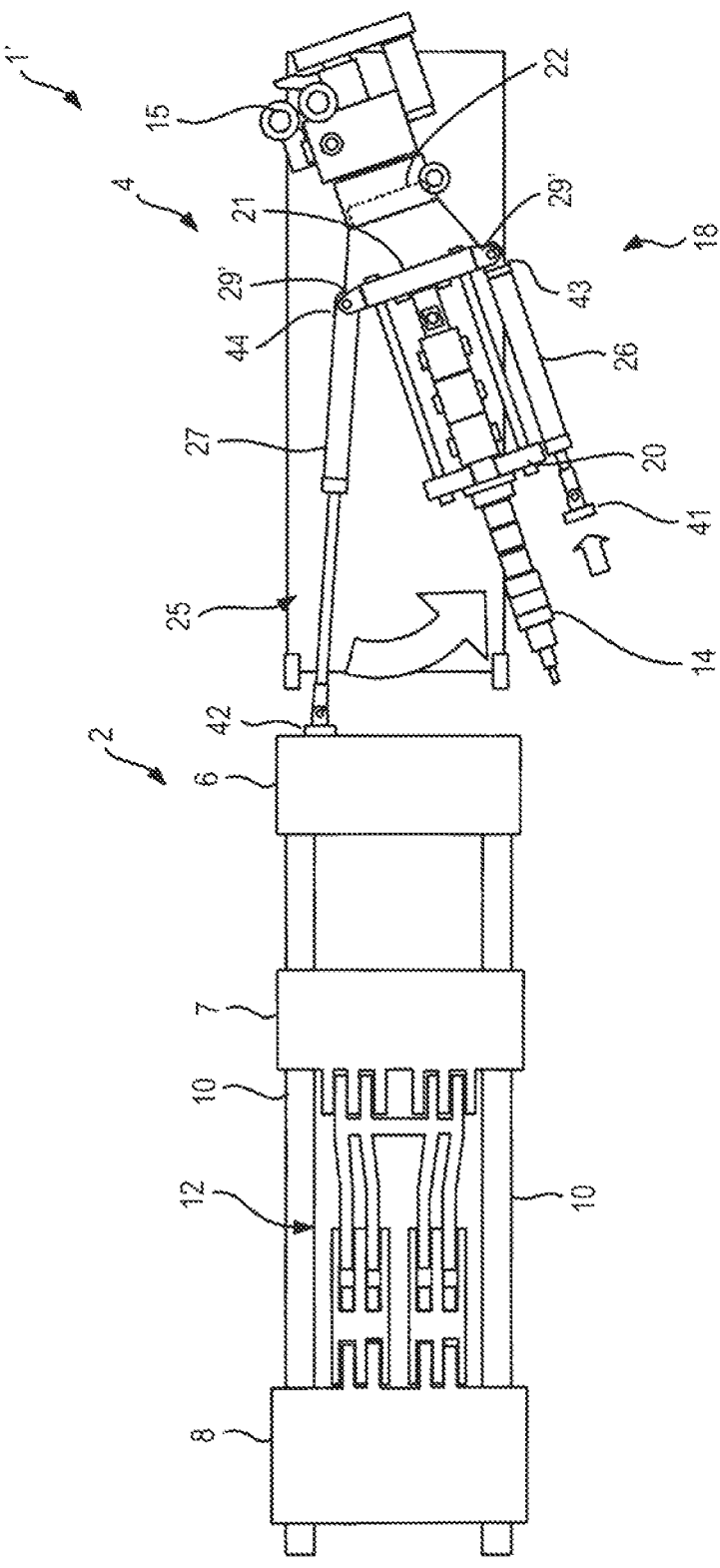
FIG. 9 is a top view showing the injection molding machine according to the present illustrative embodiment.

Maintenance of the injection device 4 in the injection molding machine 1' is performed as follows. First, the pair of piston cylinder components 26 and 27 of a moving device 25 are driven to separate the injection device 4 from the fixed platen 6. Next, the one end portion 41 of the first piston cylinder component 26 is separated from the fixed platen 6. Next, the hydraulic pressure supply mechanism (not shown) is driven to contract the first piston cylinder component 26. At this time, the second piston cylinder component 27 is stopped by the stop mechanism. As shown in FIG. 9, the injection device 4 is swiveled. At this time, since the one end portion 42 of the second piston cylinder component 27 is connected to the fixed platen 6, the second piston cylinder component 27 slightly rotates with swivel of the injection device 4, but there is no problem in maintenance.

When the maintenance is completed, a reverse procedure is performed. That is, the injection device 4 is swiveled and returned to an original state. Next, the first piston cylinder component 26 is expanded, and the end portion 41 is connected to the fixed platen 6. Also in the injection molding machine 1' according to this illustrative embodiment, only one piston cylinder component 26 is required to be separated from the fixed platen 6 and reconnected at the time of the maintenance, so that the operation time can be shortened.

{Moving Device According to Second Illustrative Embodiment}

Figure 10:
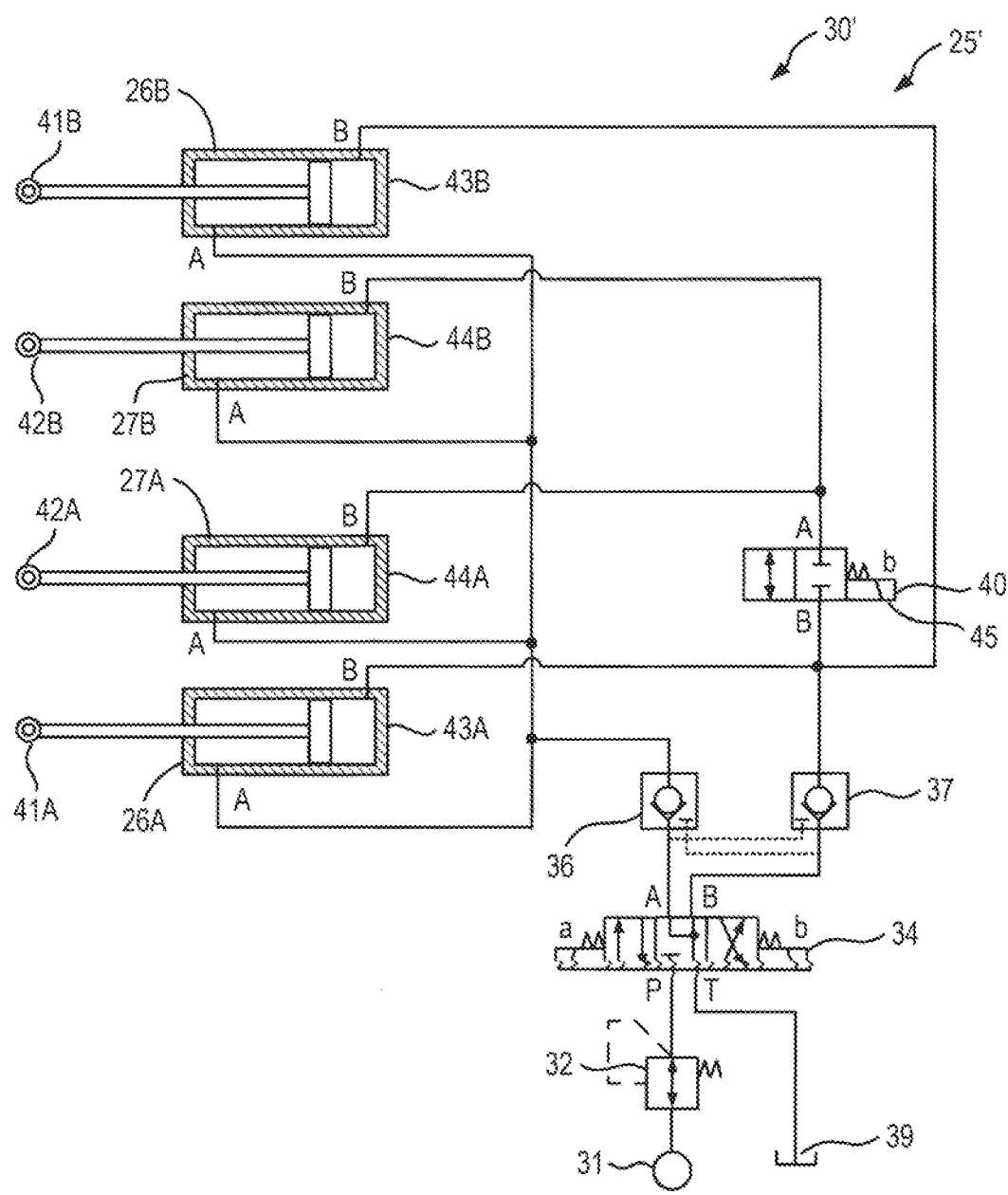
FIG. 10 is a hydraulic circuit diagram showing a moving device according to a second illustrative embodiment of the present illustrative embodiment.

The first injection device 4A and the second injection device 4B of the twin injection molding machine 1 (see FIG. 1) according to the present illustrative embodiment are described as being provided with the different moving devices 25A and 25B. That is, the hydraulic pressure supply mechanism 30A (see FIG. 2) of the moving device 25A that moves the first injection device 4A and the hydraulic pressure supply mechanism 30B (not shown) of the moving device 25B that moves the second injection device 4B are provided separately. In contrast, one common moving device 25', that is, the moving device 25' according to the second illustrative embodiment of the present illustrative embodiment as shown in FIG. 10 may be provided for the first injection device 4A and the second injection device 4B.

The moving device 25' according to the second illustrative embodiment of the present illustrative embodiment includes one hydraulic pressure supply mechanism 30'. Similarly to the hydraulic pressure supply mechanism 30A shown in FIG. 2, the hydraulic pressure supply mechanism 30' includes a hydraulic pressure source 31, a pressure reducing valve 32, a direction switching valve 34, a first pilot check valve 36, a second pilot check valve 37, and a stop valve 45. In this illustrative embodiment, the pressure oil is supplied from the first pilot check valve 36 to the A ports of the two outer piston cylinder components 26A and 26B and the A ports of the two inner piston cylinder components 27A and 27B. In addition, the pressure oil is directly supplied from the second pilot check valve 37 to the B ports of the two outer piston cylinder components 26A and 26B, and the pressurized oil is supplied to the B ports of the two inner piston cylinder components 27A and 27B via the stop valve 45.

Also in the moving device 25' according to the present illustrative embodiment, the two inner piston cylinder components 27A and 27B are piston cylinders with a stop mechanism, to which the supply of the pressure oil is allowed or stopped by the stop valve 45 as the stop mechanism 40. Therefore, similar functions as those of the twin injection molding machine 1 (see FIG. 1) according to the present illustrative embodiment in which the different moving devices 25A and 25B are provided in the first injection device 4A and the second injection device 4B are achieved, and the maintenance can be easily performed.

{Moving Device According to Third Illustrative Embodiment}

Figure 11:
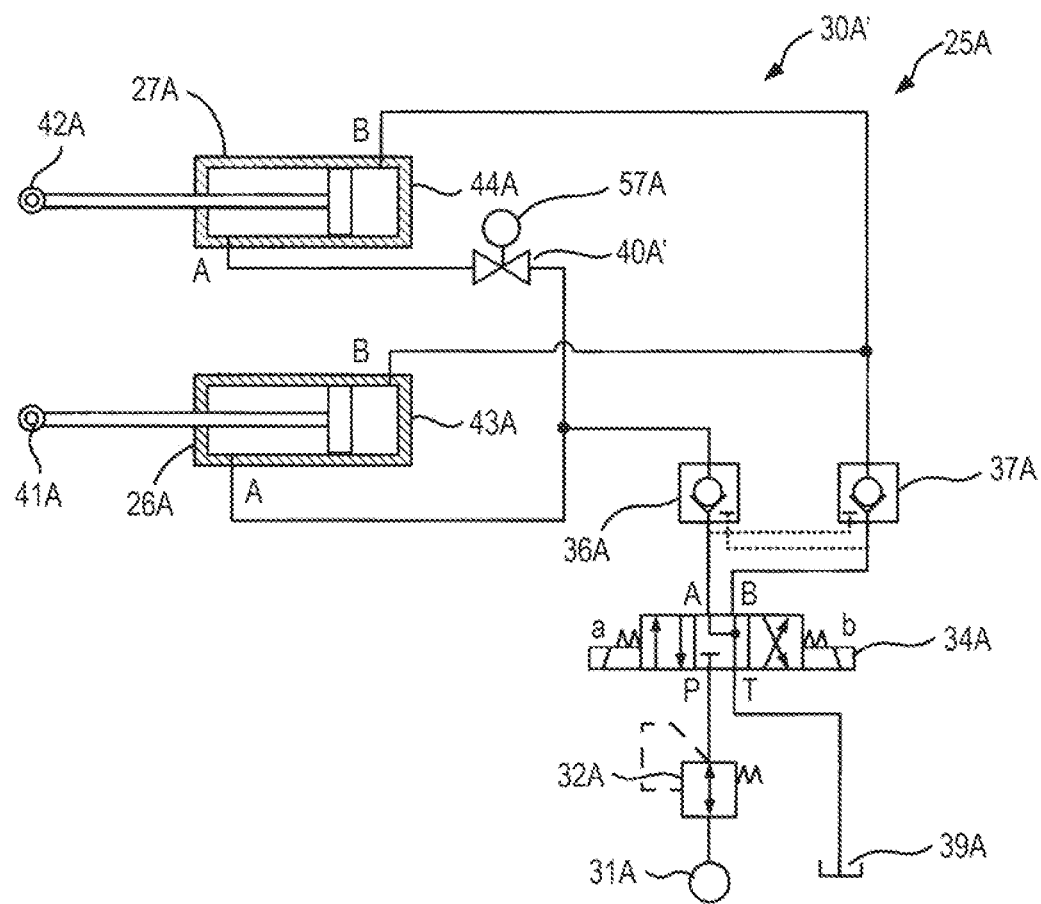
FIG. 11 is a hydraulic circuit diagram showing the moving device according to a third illustrative embodiment of the present illustrative embodiment.

The hydraulic pressure supply mechanism 30A according to the first illustrative embodiment shown in FIG. 2 can be modified as shown in FIG. 11. In a hydraulic pressure supply mechanism 30A' according to the third illustrative embodiment shown in FIG. 11, a stop mechanism 40A' is provided on an A port side of the inner piston cylinder component 27A, and is configured with an electromagnetic ON-OFF valve 57A. This illustrative embodiment also has a similar function as the hydraulic pressure supply mechanism 30A according to the first illustrative embodiment.

Although the invention made by the present inventor is specifically described above based on the illustrative embodiments, it is needless to say that the present invention is not limited to the illustrative embodiments described above, and various modifications can be made without departing from the gist of the present invention. A plurality of examples described above can be implemented in combination as appropriate.

What is claimed is:

1. An injection device comprising:
a heating cylinder;
a screw disposed in the heating cylinder;
a pair of piston cylinder components disposed on two sides of the heating cylinder, and
a direction switching valve configured to switch a direction of hydraulic fluid toward and away from both of the pair of piston cylinder components,
wherein the pair of piston cylinder components are installed so that a first end portion of each of the pair of piston cylinder components is connected to a mold clamping device, and the heating cylinder and the screw are integrally driven in a direction close to or away from the mold clamping device by expansion and contraction of the pair of piston cylinder components, and
wherein one of the pair of piston cylinder components is provided with a stop mechanism configured to prevent expansion and contraction of the one of the pair of piston cylinder components.

2. The injection device according to claim 1, wherein the stop mechanism comprises a valve provided in a hydraulic circuit of the one of the pair of piston cylinder components having the stop mechanism.

3. The injection device according to claim 2, wherein the valve comprises a stop valve.

4. The injection device according to claim 1, wherein the pair of piston cylinder components are installed so that
a second end portion, which is the other end portion, of each of the pair of piston cylinder components is connected to a member of a screw drive device that drives the screw, and
the screw drive device is driven integrally with the heating cylinder and the screw in the direction close to or away from the mold clamping device by expansion and contraction of the pair of piston cylinder components.

5. An injection molding machine comprising:
a mold clamping device configured to clamp a mold; and
an injection device configured to inject an injection material into the mold, the injection device comprising:
a heating cylinder;
a screw provided in the heating cylinder;
a pair of piston cylinder components disposed on two sides of the heating cylinder, and
a direction switching valve configured to switch a direction of hydraulic fluid toward and away from both of the pair of piston cylinder components,
wherein the pair of piston cylinder components are installed so that a first end portion of each of the pair of piston cylinder components is connected to the mold clamping device, and the heating cylinder and the screw are integrally driven in a mold clamping device direction or in a direction opposite to the mold clamping device direction by expansion and contraction of the pair of piston cylinder components, and
wherein one of the pair of piston cylinder components is provided with a stop mechanism configured to prevent expansion and contraction of the one of the pair of piston cylinder components.

6. The injection molding machine according to claim 5, in which the injection molding machine comprises the mold clamping device and two injection devices,
wherein the two injection devices are disposed symmetrically with respect to a machine center line of the mold clamping device, and
wherein the one of the pair of piston cylinder components provided with the stop mechanism in the two injection devices is a piston cylinder component close to the machine center line.

7. The injection molding machine according to claim 5, wherein the stop mechanism comprises a valve provided in a hydraulic circuit of the one of the pair of piston cylinder components having the stop mechanism.

8. The injection molding machine according to claim 7, wherein the valve comprises a stop valve.

9. The injection molding machine according to claim 5, wherein the pair of piston cylinder components are installed so that a second end portion, which is the other end portion, of each of the pair of piston cylinder components is connected to a member of a screw drive device that drives the screw, and the screw drive device is driven integrally with the heating cylinder and the screw in the direction close to or away from the mold clamping device by expansion and contraction of the pair of piston cylinder components.

10. The injection device according to claim 1, wherein only the one of the pair of piston cylinder components is provided with the stop mechanism.

11. The injection device according to claim 1, wherein the stop mechanism is further configured to allow or stop supply of the hydraulic fluid to the one of the pair of piston cylinder components.

12. The injection device according to claim 11,
wherein the direction switching valve is disposed between the pair of piston cylinder components and a hydraulic source, and wherein the stop mechanism is disposed between the one of the pair of piston cylinder components and the direction switching valve.

13. The injection molding machine according to claim 5, wherein only the one of the pair of piston cylinder components is provided with the stop mechanism.

14. The injection molding machine according to claim 5, wherein the stop mechanism is further configured to allow or stop supply of the hydraulic fluid to the one of the pair of piston cylinder components.

15. The injection molding machine according to claim 14,
wherein the direction switching valve is disposed between the pair of piston cylinder components and a hydraulic source, and wherein the stop mechanism is disposed between the one of the pair of piston cylinder components and the direction switching valve.

* * * * *